United States Patent
Seraphin

(10) Patent No.: US 7,143,145 B2
(45) Date of Patent: Nov. 28, 2006

(54) SELECTIVE CLEARING OF ENTRIES IN A WEB BROWSER CACHE

(75) Inventor: Vinod R. Seraphin, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 801 days.

(21) Appl. No.: 10/379,363

(22) Filed: Mar. 4, 2003

(65) Prior Publication Data

US 2004/0177127 A1 Sep. 9, 2004

(51) Int. Cl.
*G06F 15/16* (2006.01)

(52) U.S. Cl. .................. 709/217; 709/203; 709/219; 711/133; 711/135; 711/159

(58) Field of Classification Search ............ 709/203, 709/217–219, 213, 216, 223; 711/133–135, 711/156, 159
See application file for complete search history.

(56) References Cited

U.S. PATENT DOCUMENTS

| | | | |
|---|---|---|---|
| 5,617,540 A * | 4/1997 | Civanlar et al. ............ 709/227 |
| 5,787,470 A * | 7/1998 | DeSimone et al. ......... 709/218 |
| 6,105,131 A | 8/2000 | Carroll ....................... 713/155 |
| 6,314,492 B1 | 11/2001 | Allen et al. ................. 711/135 |
| 6,327,598 B1 * | 12/2001 | Kelley et al. ............... 715/513 |
| 6,453,342 B1 | 9/2002 | Himmel et al. ............. 709/213 |
| 6,467,026 B1 * | 10/2002 | Yamamoto et al. ......... 711/118 |
| 6,594,682 B1 * | 7/2003 | Peterson et al. ............ 709/219 |
| 6,681,298 B1 * | 1/2004 | Tso et al. ................... 711/133 |
| 2002/0078051 A1 | 6/2002 | Ullmann ..................... 707/10 |

OTHER PUBLICATIONS

Hypertext Transfer Protocall—HTTP/1.1 by Fielding et al., Jan. 1997 available from Network Working Group at MIT, pp. 1, 101, 103.

A Tao of Regular Expressions, by Steve Mansour, Jun. 5, 1999, available at http://sitescooper.org/tao_regexps.html.

* cited by examiner

*Primary Examiner*—Philip B. Tran
(74) *Attorney, Agent, or Firm*—IBM Corporation

(57) ABSTRACT

A browser having a cache protects sensitive information. A browser having a cache and a removal object is opened on a workstation. The browser receives sensitive data into the cache as a web page having a URL identifier. A designation of identifiers having sensitive data is entered into the removal object. Upon termination of a browser session or upon command the removal object is activated to selectively remove the sensitive data from the cache by using the designation.

17 Claims, 2 Drawing Sheets

SELECTIVE CLEARING OF ENTRIES IN A WEB BROWSER CACHE

TECHNICAL FIELD

The invention relates generally to protecting information stored in a web browser cache. More particularly, it relates to a method, apparatus, and program product for selectively removing portions of a web page from a cache of a web browser running on a client computer.

BACKGROUND OF THE INVENTION

A browser program running on a client computer attached to a network is capable of requesting information from another computer in the network. The information may be identified by a Uniform Resource Locator (URL) or other type of special syntax identifier. A URL for example defines a communication path to a computer having the desired information (e.g. a server) as well as a block of information called a page or web page. When a server receives a request for a page, the information is sent over the network to the requesting browser. Pages received by the browser are stored or cached by the browser on the client computer on which the browser program is running.

Caching a page on the client computer improves the overall access speed, because the browser can access the information on the page directly from the client computer, rather than re-requesting the page whenever a second or subsequent need arises for information in the page.

Some or all of the information in a page may be sensitive or confidential information such as bank balances, brokerage balances, business strategy, personal or medical data and the like, which is intended to be viewed only by the user operating the browser program. However, anyone having access to the cache, whether locally at the client computer or over the network may be able to view the sensitive information in the pages in the cache.

One way to minimize this exposure is to instruct the user at a client computer to log out and clear the cache after viewing the information or after a session of working with various pages. Typically the log out is performed by selecting an object on a web page. The user then selects various options on a taskbar of the browser program to locate a clear cache button to select. This method is awkward on present browsers, but even if a clear cache button were easily accessible, the cache is completely cleared of all pages. Subsequent needs for information in web pages which could have been provided from the cache now require re-loading these pages over the network, even for pages which have no sensitive information.

Allen et al. in U.S. Pat. No. 6,314,492 attempt to address this problem by describing a method for controlling the contents of a browser cache. A browser receives in a data stream from a host server, a clear cache tag. In response to the clear cache tag, the browser clears the cache. A server would normally place a clear cache tag in a .you are logged out. web page. When the client browser receives this web page with the clear cache tag, the browser clears its cache of data, thereby making the data unavailable from the client computer.

In another embodiment Allen et al. describe a client browser which upon receipt of a clear cache tag, clears a part of its cache, that portion of the cache containing data in a data stream between a start cache tag and the clear cache tag.

Himmel et al. in U.S. Pat. No. 6,453,342 describe a method for selectively caching web information in a browser cache. Web content is retrieved by a browser. The web content is parsed for an indication, such as a no cache tag, that the web content is to be removed from a cache after the browsing session terminates. If the no cache tag is found, then the web content is removed from the cache in response to the browsing session terminating, or after a period of time passes while the browser is idle.

U.S. Pat. Nos. 6,314,492 and 6,453,342 are hereby incorporated by reference.

The Hypertext Transfer Protocol (HTTP) is a known protocol for handling the transfer of information across a network. This protocol describes a cache control capability based on entering a "no-cache" directive in a header field of a response. When a browser receives a response having the directive in its header, no part of the response message may be cached anywhere.

Despite the aforementioned developments and capabilities, it would be advantageous to have an improved and easier to use method for selectively clearing entries in a web browser cache in order to reduce the risk of unauthorized access to sensitive or confidential data.

OBJECTS AND SUMMARY OF THE INVENTION

It is therefore a principal object of the present invention to enhance the web browsing art by providing an improved method of caching information and thereafter selectively removing various portions.

It is another object to provide such a method wherein enhanced operational capabilities are possible.

It is a further object to provide an improved system for browsing, caching and selectively removing information from the cache.

These and other objects are attained in accordance with one embodiment of the invention wherein there is provided a method of protecting sensitive information, comprising the steps of, opening a browser having a cache, on a workstation, the browser having a removal object, receiving sensitive data into the cache as a web page having a uniform resource locator identifier, entering a designation of identifiers having sensitive data, into the removal object, and thereafter activating the removal object to selectively remove the sensitive data from the cache, by using the designation.

In accordance with another embodiment of the invention there is provided a method of protecting sensitive information, comprising the steps of, opening a browser having a cache, on a workstation, the browser having a removal object, receiving sensitive data into the cache as a web page having a uniform resource locator identifier, adding one or more arguments within the identifier, to designate the sensitive data within the web page, and thereafter activating the removal object to selectively remove the sensitive data from the cache, by using the arguments.

In accordance with yet another embodiment of the invention there is provided a system for protecting sensitive information, comprising, a browser running on a workstation, the browser having a removal object, a cache in the browser having a web page with sensitive data therein, the web page having a uniform resource locator identifier, a designation of identifiers having sensitive data, within the removal object, and means for activating the removal object to selectively remove the sensitive data from the cache, by using the designation.

BEST MODE FOR CARRYING OUT THE INVENTION

For a better understanding of the present invention, together with other and further objects, advantages, and capabilities thereof, reference is made to the following disclosure and the appended claims in connection with the above-described drawings.

Figure 1:
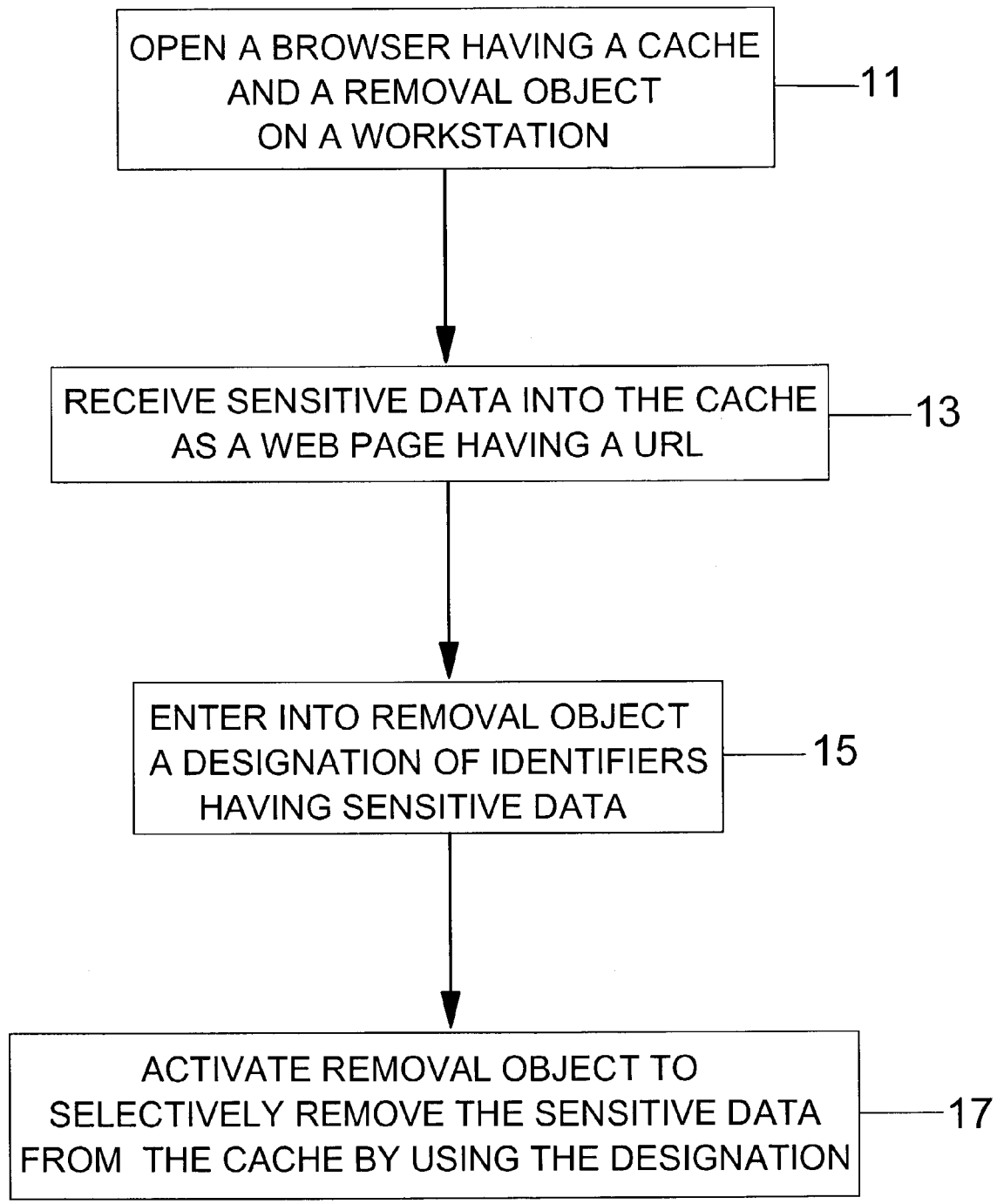
FIG. 1 is a flowchart of a method of protecting data in accordance with the present invention.

In FIG. 1 there is shown a flowchart of a method of protecting sensitive data in accordance with the present invention. In step 11 a browser having a cache and a removal object is opened on a workstation. The workstation may be any type of processing system such as a desktop, laptop, personal digital assistant (PDA), cell phone, mainframe, or the like. The workstation may be adapted for use by one or more persons simultaneously. Operational features of the workstation may include keyboard, mouse, display, stylus, trackball, microphone, speaker, camera, printer, or other features commonly found on workstations.

A browser is opened to run on the workstation. A browser is a program capable of submitting a request for information identified by a URL. The request may be sent over a network connection and the information retrieved as a web page. Typically the network connection is a connection of the workstation to the Internet. The browser may request the information by issuing a hypertext transfer protocol (HTTP) request to a server computer where the requested document identified by the URL is located. The information is typically received from the server, formatted according to a standard page description language, the Hypertext Markup Language (HTML).

The browser also has a removal object which is code capable for being executed by the browser. The code may be Java script, Java applet, object code or any other type of programming language code capable of being executed on the workstation. The removal object does not have to be present on the browser at the time the browser is opened, and may be added during the browsing session. For example, the removal object may be received from the server above or any other location on the Internet as a code page or as an object reference within a web page, or from any other location on the Internet. Alternatively, the removal object may have been added to the browser during a previous browsing session, or may have been part of the initial installation of the browser on the workstation.

The removal object is adapted to being activated upon termination of a browsing session. Other conditions for activating may also be provided including activation by a workstation user (e.g. by selecting a button) or upon command from a server on a network, or after a designated period of inactivity.

In step 13 a web page having sensitive data is received into the cache. The web page may be received over a network connection in response to a HTTP request for information identified by a URL. The request may be initiated by the user at the workstation, such as by clicking on a hypertext link in another web page, or by entering a URL in a browser input field. The request may also be initiated automatically from the operation of an application program running on the workstation or on a server in the network.

The web page may be formatted in accordance with the HTML language. In addition to text, the web page may include graphics, animation, sound, video, program code, applets, and other types of data known in the art which are also received into the cache. Any part or all of the above data types may comprise sensitive data. Data shall be considered to be sensitive if the user or anyone else authorized to have access, or anyone to whom the data refers, does not wish to allow unauthorized access to the data.

In step 15 a designation of identifiers having sensitive data is entered into the removal object. One way of making such a designation is through use of a regular expression. As used herein a regular expression shall be taken to mean a formula for matching strings that follow some pattern. The strings in this case are the URL identifiers for web pages in the cache. Regular expressions may include various metacharacters such as listed in "A Tao of Regular Expressions," by Steve Mansour dated Jun. 5, 1999. Many text editors, scripting tools, and other applications support regular expressions. The matching pattern may be all URL strings containing sensitive data. The pattern may be inherent in the scheme of assigning URL strings, or may be due to appending an argument such as &Remove to URL strings which otherwise may not have an inherent pattern. Alternatively, an argument such as &KIC (keep in cache) may also be used to designate identifiers not having sensitive data, thereby designating all others in the cache as having sensitive data.

The designation may be entered into the removal object at any time during a browsing session. For example, an application which generates URL addresses for requests, may create addresses with an inherent pattern. Knowing the pattern in advance, the application may enter the pattern into the removal object before any web pages having this URL identifier pattern are received. Likewise an application which affixes an argument to each URL knows in advance what argument or argument pattern will be used and may therefore enter this pattern as a regular expression into the removal object. The designation may also be entered after a web page or series of web pages are received in the cache. Furthermore, the designation may be retrieved from any database or location or solicited from the user via an input field.

In addition to designating a pattern of URL identifiers having sensitive data, the regular expression or other designation may indicate portions of a web page having sensitive data, by, for example, also indicating a particular data type, e.g. graphics has sensitive data. Or the designation may indicate a portion of a web page in some other way such as from line A to line B in the HTML has sensitive data. Other schemes for indicating a portion of a web page may be used.

The designation, whether a regular expression or not, may be entered into the removal object in any manner known in the art for entering a designation into an object, such as entering a string designation into a field or the like.

In step 17, the removal object is activated to selectively remove the sensitive data from the cache by using the designation. For example, the removal object may be activated at the end of a browsing session. It may also be activated from the logout page of a web application.

Figure 2:
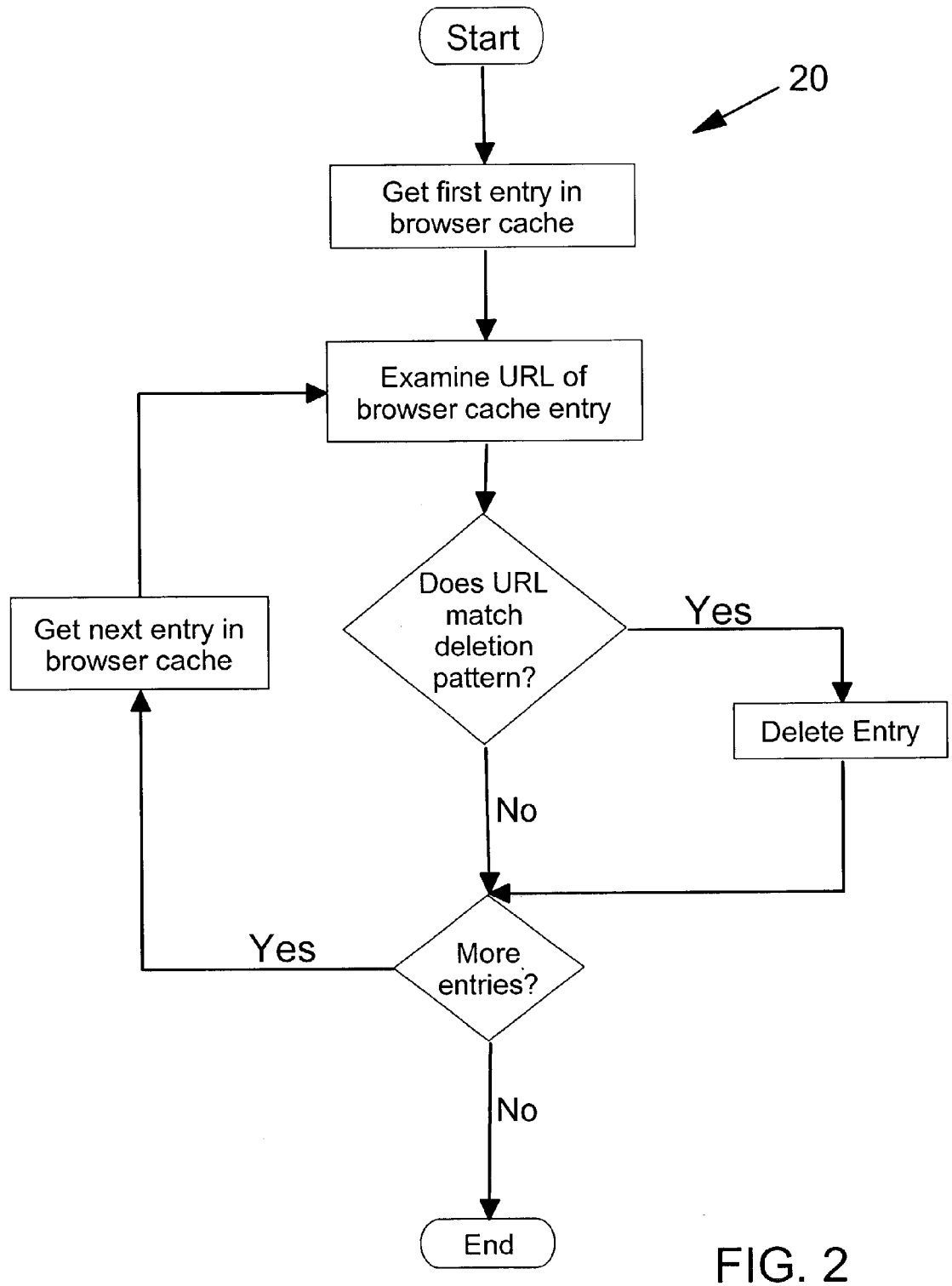
FIG. 2 is a flowchart depicting the operation of a removal object.

In FIG. 2 there is shown a flowchart 20 of an example process for removing the sensitive data by the removal object. The removal object examines the URL of each web page in the cache, in turn. If the URL matches the designation pattern, then the web page or a portion of the web page is deleted.

The removal object may be activated in step 17 by a function call. For example, a web application may have a logout button on various pages which a user at the workstation may request. If the user selects the logout button on any of the pages received, a request is sent for the logout page. When the logout page is received at the browser, a function call in the HTML code for the logout page activates the removal object to selectively remove the sensitive data in the cache by using the designation. This designation entered in step 15 may also be entered from the HTML code of the logout page. However, the designation may also be entered in other ways as explained above. Code for executing a function call is a normal part of the HTML processing capability of the browser.

While there have been shown and described what at present considered the preferred embodiments of the invention, it will be obvious to those skilled in the art that various changes and modifications may be made therein without departing from the scope of the invention as defined by the appended claims.

For example, those of ordinary skill in the art will immediately recognize that a designation or argument may be used to specify those identifiers which do not have sensitive data, and the removal object may be adapted to use such a designation or argument to remove all other pages or portions thereof, because these do contain sensitive data.

What is claimed is:

1. A method of protecting sensitive information, comprising the steps of:
   opening a browser having a cache, and a browsing session, on a workstation, said browser having a removal object;
   receiving sensitive data into said cache as a web page having a uniform resource locator identifier;
   entering a designation of identifiers having sensitive data, into said removal object; and
   thereafter activating said removal object to selectively remove said sensitive data from said cache, upon terminating said browsing session, or after a pre-specified period of inactivity, by using said designation.

2. The method of claim 1, wherein said removal object is recieved across a network from a server.

3. The method of claim 2, wherein said removal object is recieved as a code page from said server.

4. The method of claim 2, wherein said web page is recieved from said server.

5. The method of claim 1, wherein said designation is a regular expression.

6. A method of protecting sensitive information, comprising the steps of:
   opening a browser having a cache, on a workstation, said browser having a removal object whereby said opening a browser comprising a browsing session on said workstation;
   receiving sensitive data into said cache as a web page having a uniform resource locator identifier;
   adding one or more arguments within said identifier, to designate said sensitive data within said web page; and
   thereafter activating said removal object to selectively remove said sensitive data from said cache, upon terminating said browsing session, or after a pre-specified period of inactivity, by using said arguments.

7. The method of claim 6, further comprising entering a designation of identifiers having sensitive data, into said removal object.

8. The method of claim 7, wherein said designation is a regular expression.

9. The method of claim 8, wherein said removal object is activated to selectively remove said sensitive data from said cache, by applying said regular expression to said argument and said identifier.

10. A system for protecting sensitive information, comprising:
    a browser running on a workstation, said browser having a removal object;
    a cache in said browser having a web page with sensitive data therein, said web page having a uniform resource locator identifier;
    a designation of identifiers having sensitive data, within said removal object; and
    means for activating said removal object to selectively remove said sensitive data from said cache, upon termination of a browsing session, or after a pre-specified period of inactivity, by using said designation.

11. The system of claim 10, wherein said removal object comprises a code page.

12. The system of claim 10, wherein said designation is a regular expression.

13. A system for protecting sensitive information, comprising:
    a browser running on a workstation, said browser having a removal object;
    a cache in said browser having a web page with sensitive data therein, said web page having a uniform resource locator identifier;
    an argument appended to said identifier, to designate sensitive data within said web page; and
    means for activating said removal object to selectively remove said sensitive data from said cache, upon termination of a browsing session, or after a pre-specified period of inactivity, by using said argument.

14. The system of claim 13, wherein said removal object comprises a code page.

15. The system of claim 13, further comprising means for entering a regular expression into said removal object.

16. The system of claim 15, wherein said means for activating said removal object is adapted to remove said sensitive data from said cache by applying said regular expression to said argument.

17. A computer program product for instructing a processor to protect sensitive information, said computer program product comprising:
    a computer readable medium;
    first program instruction means for opening a browser having a cache, and a browsing session, on a workstation, said browser having a removal object;
    second program instruction means for receiving sensitive data into said cache as a web page having a uniform resource locator identifier;
    third program instruction means for entering a designation of identifiers having sensitive data, into said removal object; and
    fourth program instruction means for thereafter activating said removal object to selectively remove said sensitive data from said cache, upon terminating said browsing session, or after a pre-specified period of inactivty, by using said designation; and
    wherein all said program instruction means are recorded on said medium.

* * * * *